K. F. GERHARD.
SOIL TREATING APPARATUS.
APPLICATION FILED APR. 27, 1912.

1,059,141.

Patented Apr. 15, 1913.
2 SHEETS—SHEET 1.

Witnesses
Jos H Collins

Inventor
Karl F. Gerhard
By Victor J. Evans
Attorney

K. F. GERHARD.
SOIL TREATING APPARATUS.
APPLICATION FILED APR. 27, 1912.

1,059,141.

Patented Apr. 15, 1913.

2 SHEETS—SHEET 2.

Witnesses

Inventor
Karl F. Gerhard
By Victor J. Evans
Attorney

UNITED STATES PATENT OFFICE.

KARL F. GERHARD, OF HATTON, WASHINGTON.

SOIL-TREATING APPARATUS.

1,059,141.  Specification of Letters Patent.  Patented Apr. 15, 1913.

Application filed April 27, 1912. Serial No. 693,545.

*To all whom it may concern:*

Be it known that I, KARL F. GERHARD, a citizen of the United States, residing at Hatton, in the county of Adams and State of Washington, have invented new and useful Improvements in Soil-Treating Apparatus, of which the following is a specification.

This invention relates to machines for tilling the soil, and it has particular reference to a machine adapted to be used in semi-arid districts for the purpose of preparing the ground in such a manner as to conserve and utilize to the best advantage such precipitations of moisture as may occur in the form of rain or snow.

The particular object of the invention is to produce a machine of the disk type having one set of relatively small disks or cutters, whereby weeds, stubble and the like may be cut and turned under, and another set of relatively large disks or cutters of peculiar serrated construction, whereby depressions or pockets will be made in the ground for the reception of water resulting either from rainfall or from melting snows so that such moisture will permeate the ground.

A further object of the invention is to provide a disk machine of the character described of simple and improved construction wherein the sets of disks may be arranged at different angles, thereby regulating the depth to which such disks shall be permitted to enter into the ground.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
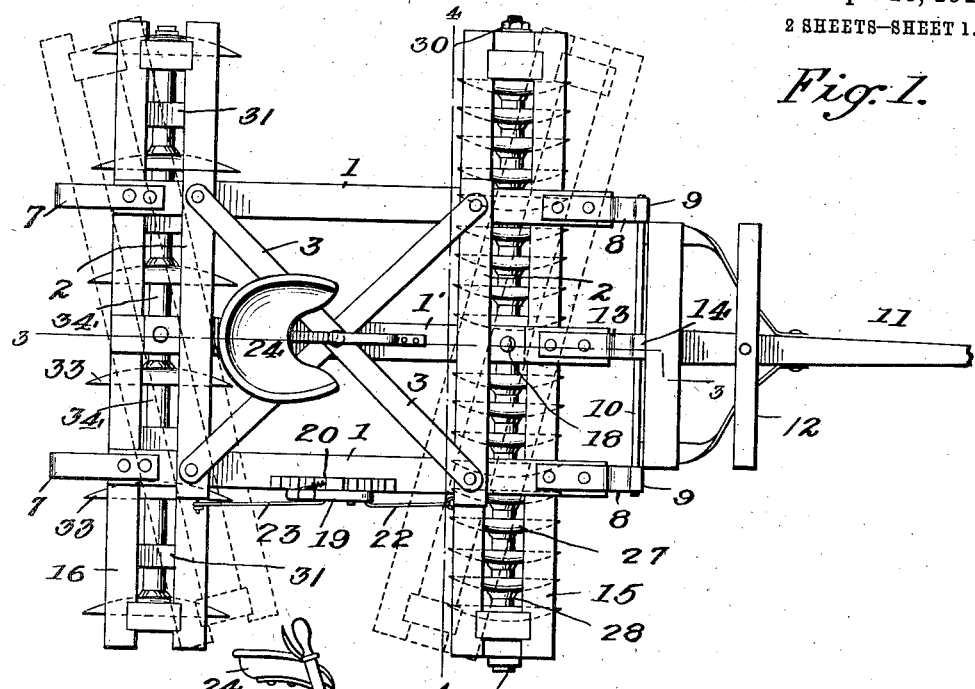
Figure 2:
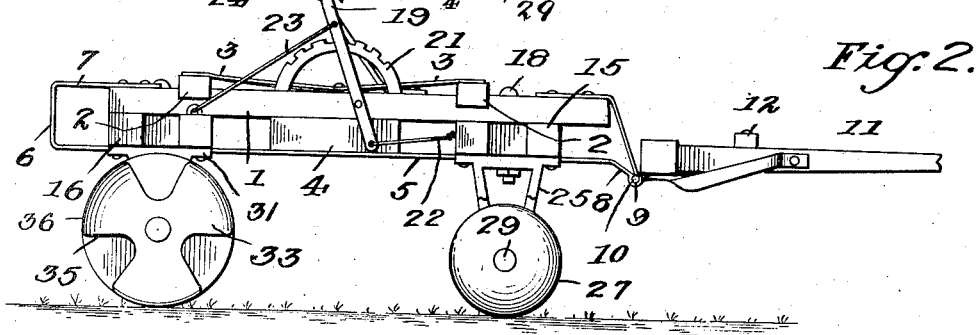
Figure 3:
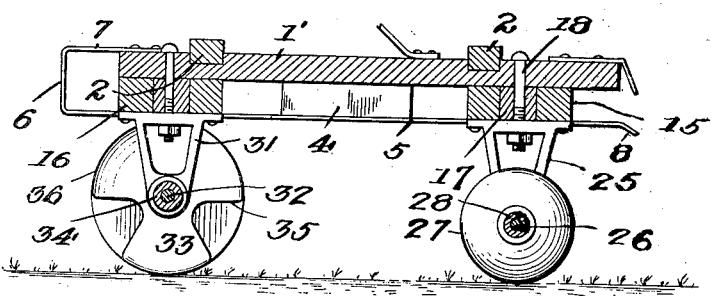
Figure 4:
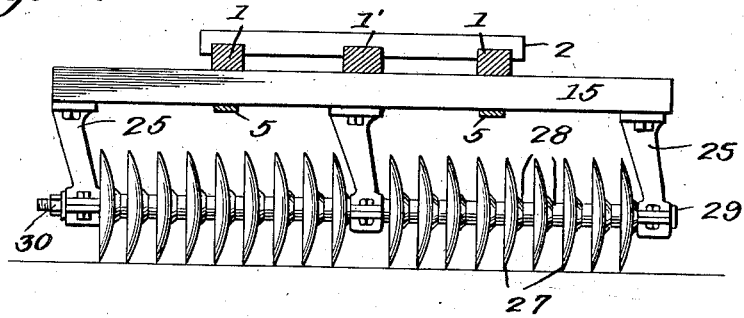
Figure 5:
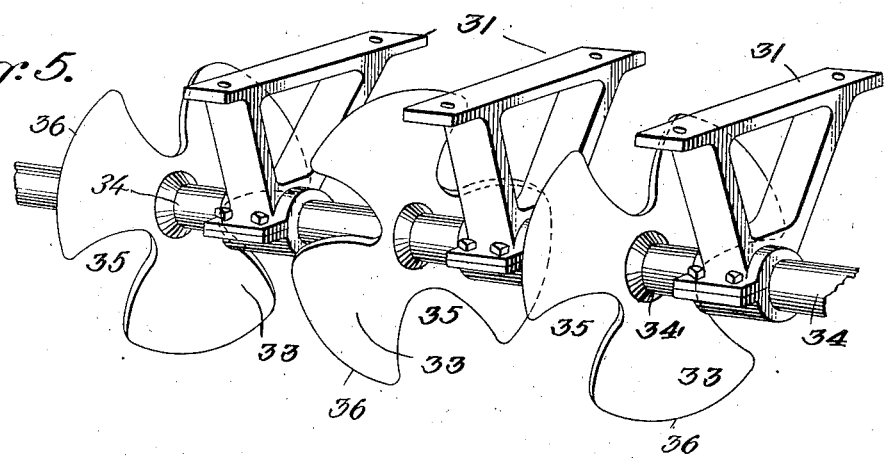
Figure 6:
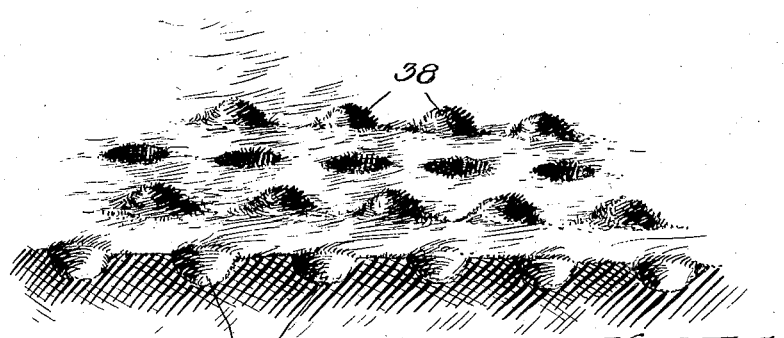

In the drawings, Figure 1 is a top plan view of the machine constructed in accordance with the invention. Fig. 2 is a side elevation of the same. Fig. 3 is a longitudinal sectional view taken on the line 3—3 in Fig. 1. Fig. 4 is a transverse sectional view taken on the line 4—4 in Fig. 1. Fig. 5 is a perspective detail view of some of the pocket forming disks. Fig. 6 is a diagram partly in perspective and partly in section showing a portion of land after treatment of the machine.

Corresponding parts in the several figures are denoted by like characters of reference.

The main carrying frame of the improved machine is composed of longitudinal frame bars 1, 1' which are connected together in parallel relation by cross bars 2, 2 and diagonal brace bars 3, 3. The outer frame bars 1, 1 are provided on their undersides with spacing blocks 4 upon which straps 5 are secured, said straps being extended rearwardly of the frame bars 1 and provided with upturned ends forming brackets 6 having forwardly bent portions constituting arms 7 which are bolted or otherwise secured on the upper sides of the frame bars 1 at the rear ends of the latter. The straps 5 are also extended forwardly and downwardly and bent to form arms or brackets 8 which are terminally secured on the upper sides of the frame bars 1 adjacent to the front ends of the latter. The bracket portions 8 are also bent to form eyes 9 for the passage of a rod 10 with which the tongue 11 is connected, said tongue carrying the draft attachment or the evener 12. The intermediate longitudinal frame bar 1' is provided at its front end with a bracket 13 having an eye 14 for the passage of the rod 10 which is thus provided with an additional support.

The straps 5, which are securely connected at their front and rear ends with the frame bars 1 and which are additionally connected with said frame bars by the spacing blocks 4, constitute supporting members for the front and rear disk carrying frames 15 and 16. Said disk carrying frames, which are substantially identical in structure, each consists of a rectangular frame provided intermediate the ends thereof with a cross bar 17 for the passage of a king bolt 18, whereby said frames are pivotally connected with the intermediate longitudinal frame bar 1' adjacent to the front and rear ends of the latter in such a manner as to be capable of swinging freely about the axis of such pin or king bolt. By extending the straps 5 beyond the front and rear ends of the frame bars 1 and securing the ends of said straps on top of the frame bars so as to form the projecting brackets 6 and 8, it is obvious that greater latitude of movement will be given to the pivoted frames 15 and 16 than would otherwise be the case, without materially increasing the bulk of the main supporting frame.

Fulcrumed on the carrying frame at one side thereof is a hand lever 19 which is provided with a stop member 20 engaging a segment rack 21. Connecting rods 22 and 23 connect the front and rear frames 15 and 16, respectively, with the hand lever 19 below and above the fulcrum of the latter, so that by manipulating said lever, the ends of the front and rear frames 15 and 16 may be moved toward or apart from each other, as indicated in dotted lines in Fig. 1, said frames being retained in any position to which they may be adjusted by the stop member 20 engaging the rack segment 21. A seat 24 for the driver or operator may be provided.

The front frame 15 is provided with hangers 25 supporting a rod or axle 26 upon which a plurality of earth engaging disks 27 are mounted. These disks which are preferably of the type known as harrow disks, are to be of a diameter of about eighteen inches and are to be placed approximately six inches apart, said disks being spaced apart by means of spools or spacing sleeves 28. One end of the rod or axle may be provided with a flange or collar 29 which is welded or otherwise secured thereon, the other end of said rod being threaded for the reception of a nut 30, whereby the disks and the spacing sleeves are secured in position, thus enabling said disks and sleeves to be readily removed for renewal or for resharpening of the disks when required. The hangers 25 are preferably made of such dimensions as to engage and constitute bearings for some of the spacing sleeves 28, and the construction is to be such as to enable the disks to revolve freely with or upon the axle.

The rear frame 16 is provided with hangers 31 constituting bearings for a shaft or axle 32 carrying a plurality of disks 33 which are separated and spaced apart by spacing sleeves or spools 34 which are directly supported by the hangers, as shown, it being preferred to provide a separate hanger for each spool or spacing sleeve in order to insure strength and stability of the machine. The disks 33 are considerably larger than the disks 27 that are used in connection with the front frame, being preferably of a diameter of about twenty-eight inches. These disks are also spaced apart a greater distance than the disks 27, being placed preferably a distance of about eighteen inches apart. Thus, when in a full sized machine eighteen disks are used in connection with the front frame, the rear frame will carry six disks. It is, furthermore, to be observed that the disks 27 and 33 which are of the convex or concave type are faced in opposite directions so that when, for instance, the front disks are faced to the left, the rear disks will be faced to the right. In operation, the disks will thus counteract each other and thereby prevent lateral motion to one side or the other.

The disks 33 are provided with equidistantly disposed deep recesses or indentations 35 forming on each disk a plurality of equidistant cutting arms or blades 36, the disks being, moreover, so arranged with relation to each other that the recesses 35 of each disk will coincide or register with the arms or blades 36 of the proximate disk or disks. It will be readily understood that when the machine is in operation, the serrated disks 33 instead of cutting furrows in the ground will form pockets or recesses, the dirt excavated by the formation of each of said pockets being turned over or deposited on a portion of the land which is left undisturbed, owing to the presence of the recesses 35 in the disks 33.

It will be seen that by the operation of this improved implement the forward series of disks 27 will serve to cut, chop and turn under the weeds, stubble and other vegetation on the ground, said disks operating only to a limited depth, owing to their relatively small dimensions. The larger disks 33 which follow behind will serve to form distinct pockets or indentations, as indicated at 37, in Fig. 6 of the drawings, said pockets being of a capacity to hold and retain a considerable quantity of water. These pockets also alternate with small hills 38 formed in the excavated soil, and said pockets will, therefore, gather and retain the rain or snow as it falls. It is evident that even on hillside lands where moisture when precipitated is usually quickly shed and permitted to run waste, such moisture will be conserved and utilized to the best advantage, while on level lands the recesses or pockets 37 will retain the moisture much longer than would otherwise be the case, owing to the presence of the pockets in which moisture will settle and accumulate and be conserved for a much greater length of time than would otherwise be possible.

I am aware that earth engaging cultivating disks have heretofore been made with toothed or serrated edges or with fingers or projections for the purpose of assisting in reducing the soil to the desired pulverized condition. Disks of such a character are not claimed by me. The disks 33 shown and described by me are not only of relatively large diameter, especially as compared with the disks 27, but it will, furthermore, be seen that the arms or blades 36 formed between the equidistant recesses are relatively few in number and of relatively large size. It is meant thereby that said arms or blades are to be sufficiently large to form individual digging blades which do not operate by merely crushing and crumbling the soil, but by forming in the surface of the soil distinct recesses or pockets, said recesses or pockets being formed by removing a portion of the dirt, turning the same over and depositing it upon the surface of the land intermediate other recesses or pockets. It is evident that to form blades 36 sufficiently large for this purpose, only relatively few of such blades may be formed on a disk of the average dimensions, that is to say, about 28 inches diameter. In the drawings hereto annexed, each disk has been shown as provided with three equidistant recesses forming three individual blades 36, and while it is not desired to be understood that the expression "relatively few" in the appended claims is to be construed as a strict limitation to this number, any number in excess thereof whereby the individuality of the blades as digging blades would be lost and where the action of the blades or arms would merge into a crumbling or clod-crushing action would be outside of the scope of the present invention.

Having thus described the invention, what is claimed as new, is:—

1. In a machine of the character described, a main frame, disk carrying frames pivotally associated therewith adjacent to the front and rear ends of said main frame, relatively small disks associated with the front disk carrying frame, said disks being placed relatively close together, and relatively large serrated disks associated with the rear disk carrying frame and spaced relatively wide apart said serrated disks being each provided with a relatively small number of equidistantly arranged individual digging blades; the several disks being provided with concave faces and the disks associated with the front and the rear frames being faced in opposite directions.

2. In a machine of the character described, a main frame, disk carrying frames associated therewith adjacent to the front and rear ends of said main frame, relatively small disks carried by the front disk carrying frame, and relatively large disks carried by the rear disk carrying frame, said large disks being provided with relatively few equidistant notches whereby equidistant individual cutting blades are formed, and said disks being mounted to present the recesses of each disk in registry with the cutting blades of the proximate disks.

3. In a machine of the character described, a main frame, disk carrying frames pivotally associated with the main frame adjacent to the front and rear ends thereof, relatively small disks carried by the front disk carrying frame and relatively large disks carried by the rear disk carrying frame, said relatively large disks being provided with equidistant notches and with relatively large individual blades spaced widely apart by said notches to form separate and distinct indentations forming pockets in the ground; in combination with means for adjusting the disk carrying frames with relation to the main frame and for retaining said disk carrying frames at various adjustments.

In testimony whereof I affix my signature in presence of two witnesses.

KARL F. GERHARD.

Witnesses:
 ALFRED V. MARION,
 ERNEST A. EDWARDS.